US009524436B2

(12) United States Patent
Salter et al.

(10) Patent No.: US 9,524,436 B2
(45) Date of Patent: Dec. 20, 2016

(54) AUGMENTED REALITY CAMERA REGISTRATION

(75) Inventors: Tom Salter, Farnham (GB); Ben Sugden, Woodinville, WA (US); Ben Woodhouse, Guildford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 13/312,869

(22) Filed: Dec. 6, 2011

(65) Prior Publication Data

US 2013/0141461 A1 Jun. 6, 2013

(51) Int. Cl.
   *G09G 5/00* (2006.01)
   *G06K 9/00* (2006.01)
   *G06T 7/00* (2006.01)

(52) U.S. Cl.
   CPC ......... *G06K 9/00671* (2013.01); *G06T 7/0044* (2013.01); *G06T 2207/30204* (2013.01)

(58) Field of Classification Search
   USPC ........................................ 345/633
   See application file for complete search history.

(56) References Cited

U.S. PATENT DOCUMENTS

| 6,571,146 B1 * | 5/2003 | Dennehy | G06T 17/10 345/420 |
| 7,808,524 B2 * | 10/2010 | Park et al. | 348/162 |
| 2002/0032697 A1 * | 3/2002 | French | G06T 17/005 715/211 |
| 2005/0174470 A1 * | 8/2005 | Yamasaki | 348/345 |
| 2007/0038944 A1 | 2/2007 | Carignano et al. | |
| 2008/0266323 A1 | 10/2008 | Biocca et al. | |

(Continued)

FOREIGN PATENT DOCUMENTS

| EP | 0843155 B1 * | 2/2002 |
| EP | 1980999 A1 * | 10/2008 |
| WO | WO 9736147 A1 * | 10/1997 |

OTHER PUBLICATIONS

Bath, et al., "UAV Localisation & Control through Computer Vision", Retrieved at <<Proceedings of the Australasian Conference on Robotics and Automation>>, 2005, pp. 6.

(Continued)

*Primary Examiner* — Ryan R Yang
(74) *Attorney, Agent, or Firm* — Brianna Hinojosa-Flores; Judy Yee; Micky Minhas (57) ABSTRACT

A system and method executable by a computing device of an augmented reality system for registering a camera in a physical space is provided. The method may include identifying an origin marker in a series of images of a physical space captured by a camera of an augmented reality system, and defining a marker graph having an origin marker node. The method may further include analyzing in real-time the series of images to identify a plurality of expansion markers with locations defined relative to previously imaged markers, and defining corresponding expansion marker nodes in the marker graph. The method may further include calculating a current position of the camera of the augmented reality system in the physical space based on a location of a node in the marker graph corresponding to a most recently imaged marker, relative to the origin marker and any intermediate markers.

15 Claims, 9 Drawing Sheets

(56) References Cited

U.S. PATENT DOCUMENTS

| | | |
|---|---|---|
| 2010/0045869 A1 | 2/2010 | Baseley et al. |
| 2010/0111405 A1* | 5/2010 | Lee et al. |
| 2011/0134108 A1* | 6/2011 | Hertenstein ............... 345/419 |
| 2011/0313779 A1* | 12/2011 | Herzog et al. ............. 705/1.1 |
| 2012/0319949 A1* | 12/2012 | Lee .......................... 345/158 |

OTHER PUBLICATIONS

Echtler, et al., "Splitting the Scene Graph using Spatial Relationship Graphs Instead of Scene Graphs in Augmented Reality", Retrieved at <<http://campar.in.tum.de/pub/echtler2008split/echtler2008split.pdf>>, GRAPP, 2008, pp. 456-459.

Kurillo, et al., "Wide-Area External Multi-Camera Calibration using Vision Graphs and Virtual Calibration Object", Retrieved at <<http://glorfindel.mavrinac.com/~aaron/school/pdf/kurillo08_calibvg.pdf>>, Second ACM/IEEE International Conference on Distributed Smart Cameras, Sep. 7-11, 2008, pp. 1-9.

* cited by examiner

AUGMENTED REALITY CAMERA REGISTRATION

BACKGROUND

In augmented reality systems, a view of the physical, real world is made visible through a see-through display or is captured by a camera and displayed to a user on a display, along with computer generated images. Thus, the real world and the computer generated images are concurrently visible to the user. In some applications, the position, size, orientation, etc. of the computer generated images may change based on objects in the field of view of the camera. Thus, to display the computer generated images in a manner that is appropriate, it is useful to properly determine the location of the camera in the physical world, a process that is referred to as "registering" the camera.

To aid in accurately registering the camera, prior augmented reality systems have used markers that contain optical codes. The markers are placed at precise, known locations within a physical space. Image processing techniques are used to identify the optical codes in the markers in the captured images of the physical space. From the location of the markers in the images, and the known location of the markers in the physical space, the position of the camera is determined.

In such an approach, the accuracy of the camera registration depends on how much care is taken to place the markers at the proper locations in the physical space. In practice, to register the camera with an acceptable degree of accuracy for most augmented reality applications takes a significant amount of time, labor, and care, which detracts from the user experience. Further, the physical space in which such augmented reality systems may be used is limited to the space in which markers have been placed at the known locations. The system will not be able to properly display computer generated images to a user who wanders off outside of a carefully constructed augmented reality space, since there are no markers outside of the space by which the camera can be properly registered by the system.

SUMMARY

A system and method executable by a computing device of an augmented reality system for registering a camera physical space is provided. The method may include identifying an origin marker in a series of images of a physical space captured by a camera of an augmented reality system, and defining a marker graph having at least one origin marker node. The method may further include analyzing in real-time the series of images to identify a plurality of expansion markers with locations defined relative to previously imaged markers, and defining corresponding expansion marker nodes in the marker graph. The method may further include calculating a current position of the camera of the augmented reality system in the physical space based on a location of a node in the marker graph corresponding to a most recently imaged marker, relative to the origin marker and any intermediate markers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
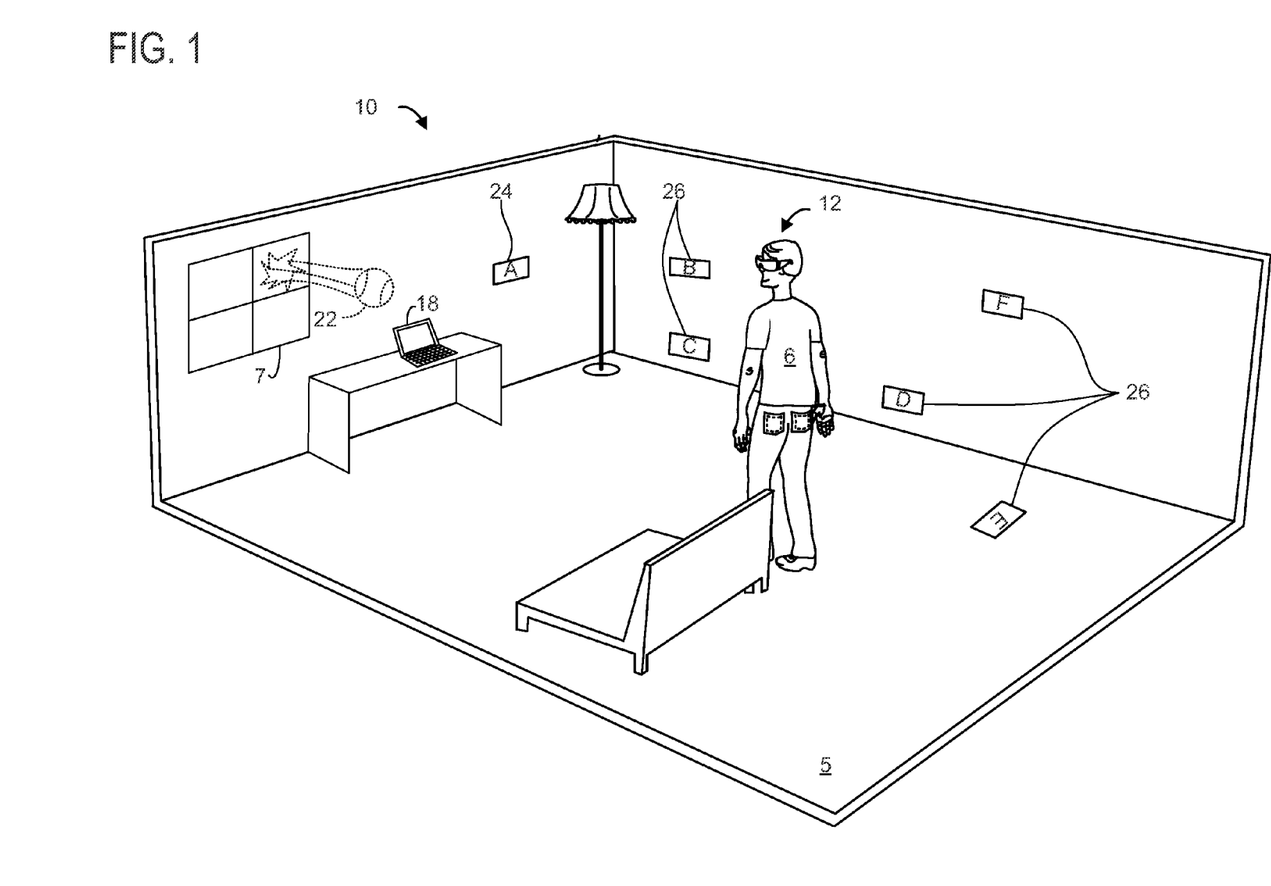
FIG. 1 is a perspective view of a first embodiment of an augmented reality system configured to register a camera in a physical space.

FIG. 1 illustrates generally an embodiment of an augmented reality system 10 deployed in a physical space 5. In this embodiment, the augmented reality system 10 includes a head mounted display device 12 configured to wirelessly communicate with an external computing device 18. It will be appreciated that in other embodiments, the computing device 18 may be miniaturized and fitted within the head mounted display device 12, for example, as application specific integrated circuit (ASIC) or a system on a chip.

Figure 2:
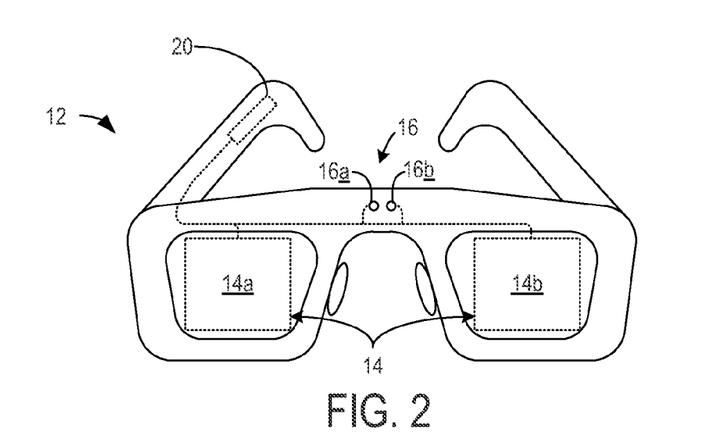
FIG. 2 is a front view of an example head mounted display device of the augmented reality system of FIG. 1.

Turning briefly to FIG. 2, the head mounted display device 12 includes a see-though display 14 having a left and right display regions 14a, 14b, and one or more cameras 16 such as a visible light camera 16a and a depth camera lab. Motion sensors may also be provided to sense an orientation of the head mounted display device 12, if desired. In this embodiment, the head mounted display device 12 is configured to wirelessly communicate with the computing device 18 via a transceiver 20 in the head mounted display device 12, and a corresponding transceiver in the computing device 18 to send image data from cameras 16, and to receive image data for display on display 16.

Returning to FIG. 1, the computing device 18 receives signals from the camera 16 of the head mounted display device 12, and processes those signals to register the camera 16 in the physical space 5, according to the methods described in detail below. Further, the computing device 18 generates appropriate augmented reality objects 22, which are computer generated images, and transmits the augmented reality objects 22 to the head mounted display device 12 for display on display 14. In this manner, a user 6 wearing the head mounted display device 12 may view not only the real objects in physical space 5 such as window 7, but also augmented reality objects 22 displayed as if to appear within the environment, such as the illustrated baseball crashing through the widow 7.

To aid in proper registration of the camera 16 of the head mounted display device 12 in the physical space 5, the augmented reality system 10 may utilize a plurality of augmented reality markers, including at least one origin marker 24 and multiple expansion markers 26. The origin marker is placed in a known or predefined location. For example the origin marker may be placed 10 feet in front of the camera, at a height of 4 feet off the ground, and may define the origin (0, 0, 0) of a three dimensional coordinate system defining the physical space. This predefined, known location of the origin marker is typically stored in a data store in memory of the computing device 18. It will be appreciated that each of the markers has a predetermined size, shape, and respective optical code encoded thereon that is recognizable by the augmented reality system 10.

Figure 4A:
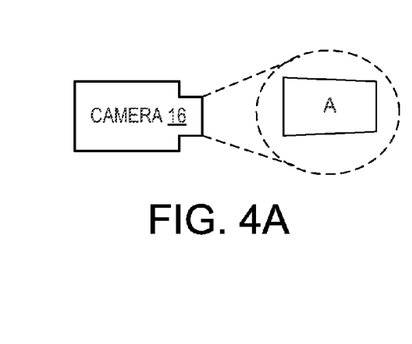
FIGS. 4A-4H are a series schematic views showing the camera of the system of FIG. 1, capturing the different markers illustrated in FIG. 1 in its field of view, at different time steps.
Figure 4B:
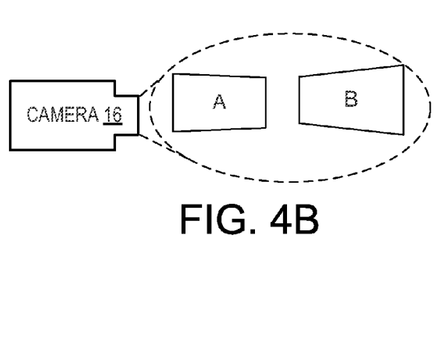

As the user scans the room wearing the head mounted display device 12 equipped with camera 16, a series of images are captured. These images include images of the origin marker, and of the expansion markers. FIGS. 4A-4G illustrate one example series of images that may be captured by the camera 16. FIG. 4A illustrates an image of origin marker A, while FIG. 4B illustrates an image of origin marker A with one expansion marker B. By examining the relative position, size, and shape of the markers A and B, a relative difference in location between the markers can be determined. In one embodiment, this difference in location is computed and stored as a transformation matrix. The transformation matrix is constructed so as to represent not only difference in position in three dimensional space, but also differences in orientation of the marker surface on which the optical code is encoded. Thus, a 4×4 transformation matrix may be used in which a position vector representing the position of the child node relative to the parent node is encoded along with a rotational submatrix that contains a degree of rotation around each of three orthogonal axis. Thus, the transformation matrix for the difference between markers A and B will not only record their positional differences via a vector from A to B, but will also record the difference in orientation, of the surface of B relative to A, for each of three orthogonal axes.

It will be appreciated that a variety of other mechanisms may be used to represent the difference in locations of a parent and child marker. For example, a 4×3 transformation matrix may be used, a position vector and quaternion may be used, or a position vector and Euler angles may be used. Further, in some embodiments it will be appreciated that relative orientation differences may not be tracked, and thus a vector may be sufficient to represent the relative difference in position between a parent and child marker.

Figure 4C:
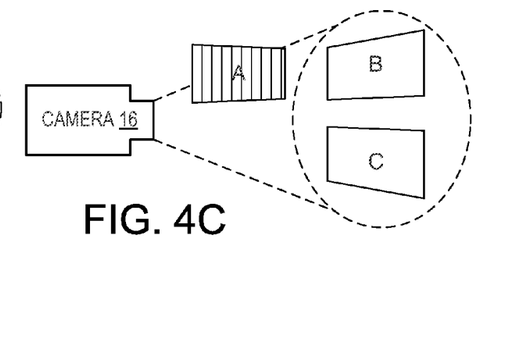
Figure 4D:
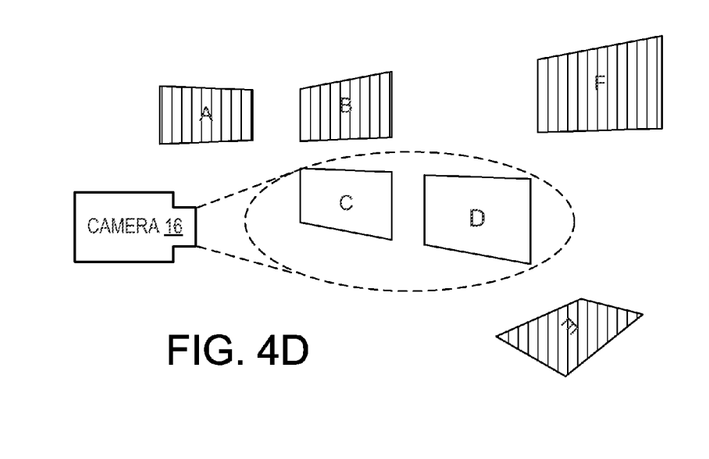
Figure 4E:
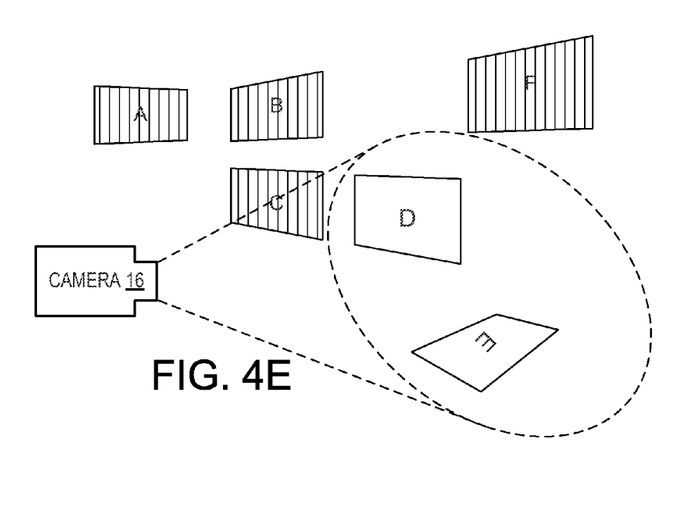
Figure 4F:
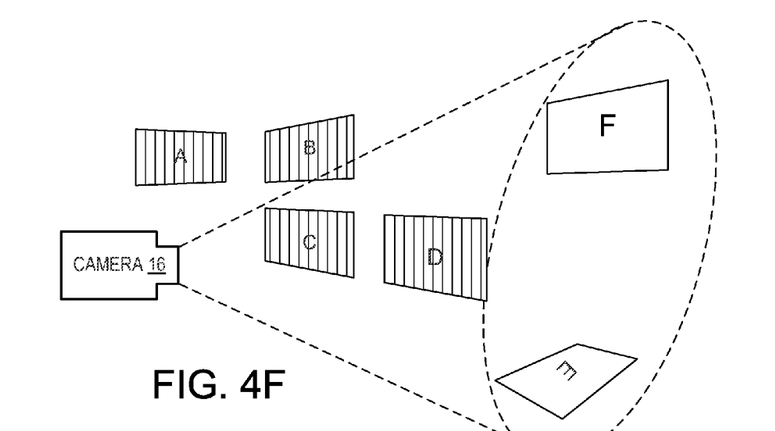

In FIG. 4C, the camera 16 has moved so that now origin marker A is no longer in the field of view of the camera 16, however, a pair of expansion markers B and C are in view. Similarly, in FIGS. 4D, 4E, and 4G, expansion markers C and D, D and E, and E and F respectively, are in view. For each of the images, the relative position of a newly imaged expansion marker may be computed relative to a previously imaged expansion marker which is captured in the same image. In this manner the three dimensional position of B relative to A, C relative to B, D relative to C, E relative to D, and relative to E may be determined.

Figure 5:
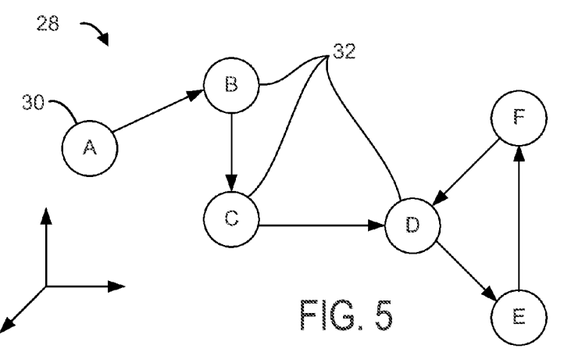
FIG. 5 is a graphical representation of a marker graph generated to represent the relative positions of the markers of FIGS. 4A-4G.

FIG. 5 illustrates how these relative positions may be represented in a marker graph 28. Marker graph 28 includes a plurality of nodes, linked by vectors in three dimensional space. In one embodiment, marker graph 28 is a directed acyclic graph. An origin marker node 30 is included corresponding to the position of the origin marker A, and expansion marker nodes 32 are linked as child nodes to either the origin marker node or to a parent expansion marker node.

A camera registration module, illustrated in FIGS. 8 and 9 below, may be provided on the computing device to receive the images, construct the marker graph, and register the camera using the constructed marker graph. To construct the marker graph 28, the registration module may be configured initially to identify an origin marker that is in at least one image in a series of images of a physical space captured by a camera of an augmented reality system. The relative position of the camera to the origin marker is calculated using imaging processing techniques, by examining the size, shape, and position of the origin marker in the capture image. Depth information from the depth camera may also be used to estimate the depth from the camera to the origin marker. Next, an instance of the marker graph is defined having an origin marker node at a location corresponding to a known location of the origin marker in the physical world. Then, in real-time as the user scans the camera around the physical space 5, a series of images is captured and analyzed to identify a plurality of expansion markers.

The analysis to identify each expansion marker includes identifying at least one image in the series that contains both the expansion marker and at least one previously imaged marker, the previously imaged marker being either the origin marker or a previously imaged expansion marker. The analysis to identify each expansion marker further includes determining a relative difference in location from the at least one previously imaged marker to the expansion marker based on the relative shape, size and/or position of each in the at least one of the images. This may be accomplished using transformation matrix described above, and thus a difference not only in position, but also in orientation of the parent and child markers may be determined. Finally, the analysis to identify each expansion marker further includes adding an expansion marker node for the expansion marker to the marker graph, at the relative difference in position and orientation to the at least one previously imaged marker node. The result is that child nodes representing expansion markers are added to the marker graph as illustrated in FIG. 5.

Periodically, as the user scans the camera around the physical space 5, the current position of the camera of the augmented reality system in the physical space may be calculated. To calculate the position, a registration module of the computing device can perform image processing on a most recently imaged marker to determine the marker's distance and direction from the camera. If a depth camera is included in the augmented reality system, then depth to the marker may be identified by the depth camera, otherwise, depth may be determined by the imaged size and shape of the marker as compared to the marker's known size and shape. Thus, as illustrated by a dashed line in FIG. 4H the position of the camera relative to the most recently imaged marker may be determined using image processing techniques, and also optionally using depth information, as described above.

Once the distance and direction from the camera to the expansion marker is known, then the location of the expansion marker itself may be computed using the marker graph. To accomplish this, the location of a node in the marker graph corresponding to a most recently imaged marker, relative to the origin marker and any intermediate markers is determined. Based on the location of the most recently imaged marker location in the physical space, and the location of the camera relative to the most recently imaged marker in the physical space, the location of the camera in the physical space relative to the known location of the origin marker can be determined.

Figure 4G:
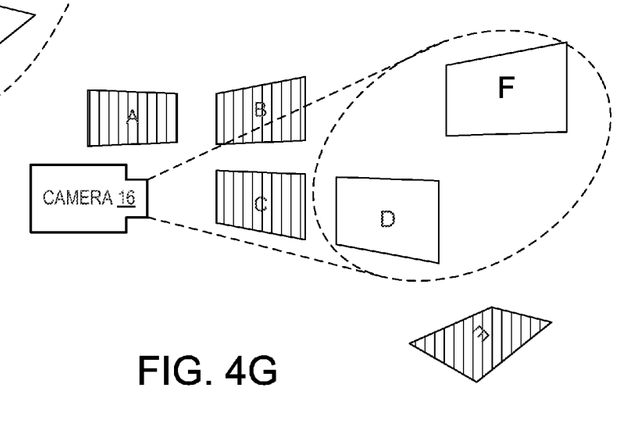
Figure 4H:
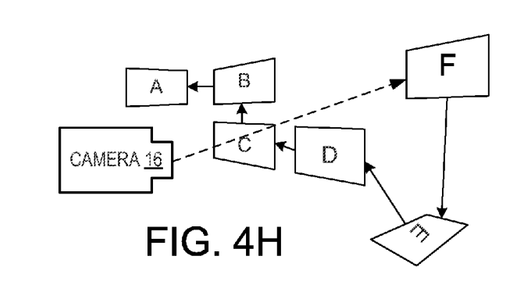

Thus, as shown in FIG. 4H, the position of expansion marker F is determined relative to the origin by tracing the relative positions from the most recently imaged marker F to the origin marker A by traversing the corresponding nodes in the marker graph from F to E, E to D, D to C, C to B, and B to A, as shown in arrows in FIG. 4H. In some representations, this process may be simplified by defining the origin of a three dimensional coordinate space for the physical world at the origin node, and examining the difference in position of the node for the most recently imaged marker relative to the origin, rather than traversing the graph.

It will be appreciated that the approximations of image processing techniques and depth cameras will not result in a perfectly accurate marker graph on the first scan of a physical space by a camera. To address this, as the camera continues to scan the physical space, images are continually analyzed, and relative distances and directions between markers are determined. The marker graph may thus be recalibrated by receiving a recalibration image that contains at least a parent-child pair of previously imaged markers, recalculating relative distances and directions between each of the plurality of previously imaged markers in the recalibration image based on the relative position of each in the image, and updating the marker graph based on the recalculating of the recalibration image. In this manner, the accuracy of the marker graph may be continually improved.

Figure 5A:
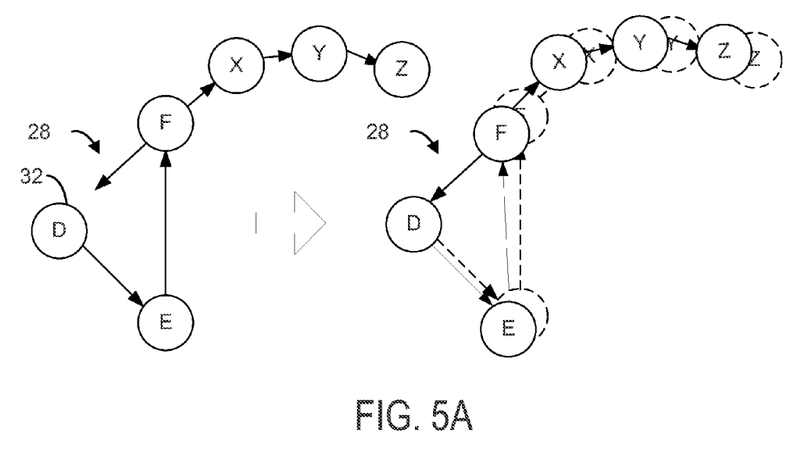
FIG. 5A is a graphical representation of the recalibration of a portion of the marker graph, based on newly received location information for some markers.

A graphical illustration of this recalibration is provided in FIG. 4G and FIG. 5A. FIG. 4G shows expansion markers F and G being imaged in a recalibration image. It will be appreciated that the relative positions between markers F and E and E and D have already been determined at this stage of imaging. Upon determining the relative distance and direction between markers D and F using recalibration image in FIG. 4G, the marker graph may be updated as shown in FIG. 5A. On the left in FIG. 5A is shown a discrepancy (gap) between the measured vector between F and D and the expected vector. The graph is then modified to recalculate not only the vector between nodes D and F, but also between D and F and D and E. Further, if any other child nodes exist off of nodes E or F, such as the illustrated nodes X, Y, and Z, the positions of these child nodes is also adjusted. To account for error, only vectors within a threshold permissible variance from the current vector linking two nodes may be accounted for when performing recalculation. Further, the average of all measured vectors between two nodes that fall within this variance may be computed to determine the current vector. It will be understood that the transformation matrix described above is typically used to represent the relative positions and orientations of these markers and their corresponding nodes and is typically adjusted during recalibration.

Figure 3:
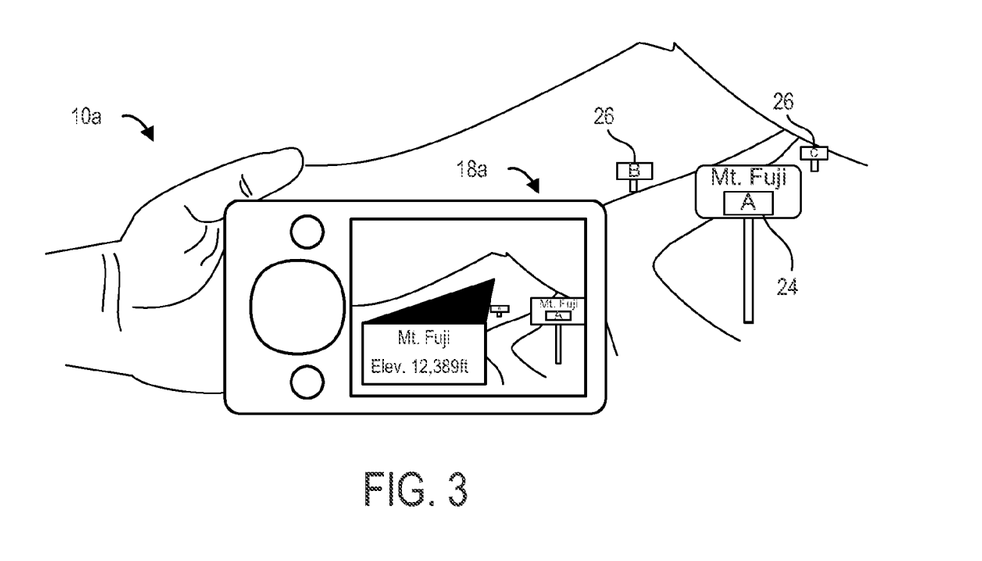
FIG. 3 is a front view of another embodiment of an augmented reality system including a mobile computing device configured to register a camera in a physical space.

It will be appreciated that in some embodiments the augmented reality system may not incorporate a head mounted display device. For example, FIG. 3 illustrates another embodiment of an augmented reality system 10a, in which the computing device is a mobile computing device 18a housing an integrated camera and display. In the depicted embodiment, the mobile computing device 18a is in the form of a smartphone, however, it will be appreciated that the telephone functionality may be omitted, and the mobile computing device 18a may be in the form of a personal data assistant, smart camera, or other mobile computing device configured to capture images, and display the images in conjunction with augmented reality objects. By virtue of the portability of mobile computing device 18a, the device lends itself to capturing outdoor or travel scenes, such as the depicted image of Mt. Fuji, with augmented reality information displayed thereon in the form of place name and elevation information. In this embodiment, the markers may be user-placed or may be placed by third parties in the environment. Thus, an informational sign or guidepost may be provided with an augmented reality origin marker 24 or expansion marker 26, as shown.

Figure 6:
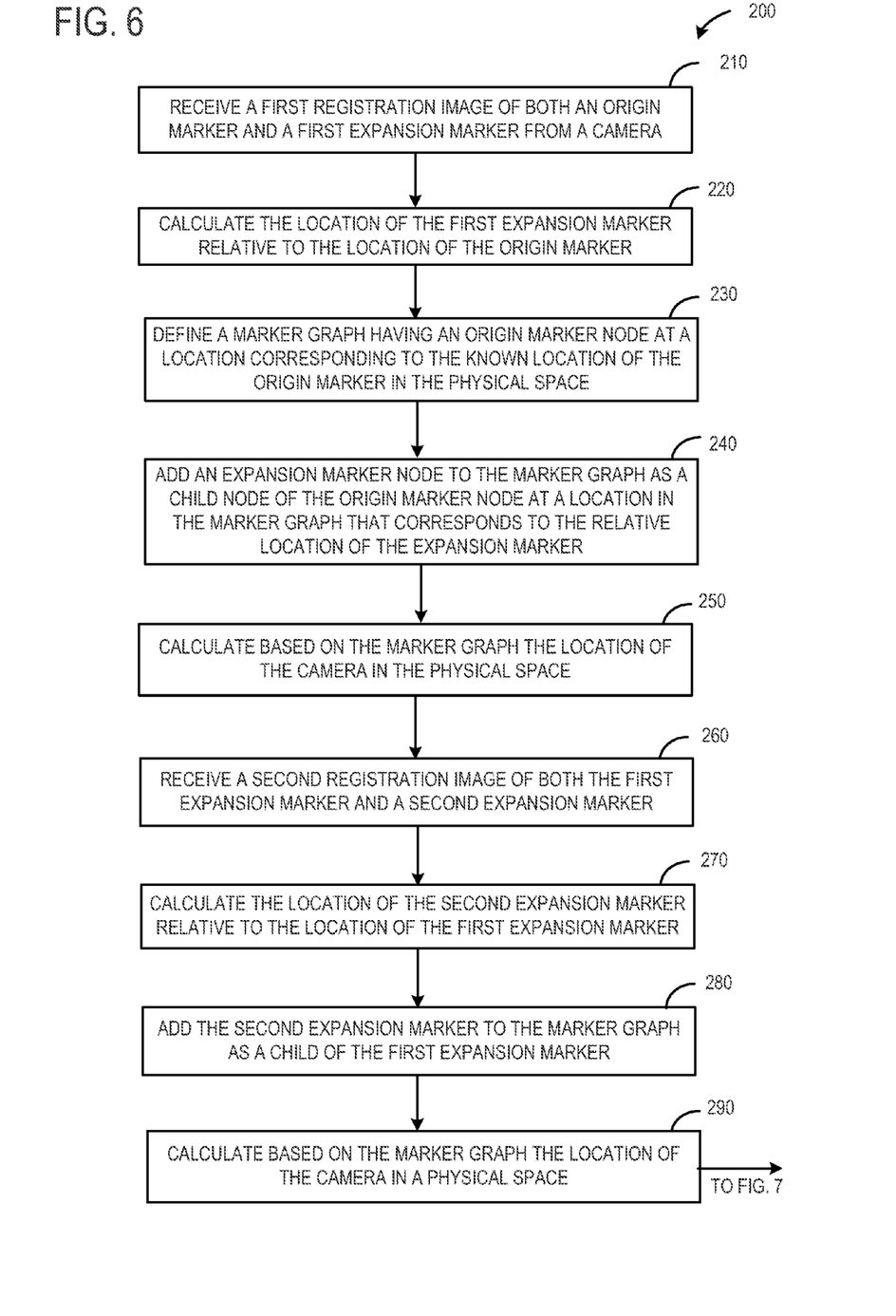
FIG. 6 is a flowchart of a method for registering a camera of an augmented reality system, according to one embodiment.

FIG. 6 shows an example method 200 for registering a camera in a physical space. It will be appreciated that method 200 is executable by a computing device of an augmented reality system such as described above, and thus the hardware embodiments described above may be configured to perform method 200. Alternatively, other suitable hardware may be utilized. Method 200 typically is implemented by a registration module stored in mass storage on the computing device and executed by a processor of the computing device using portions of memory.

At 210, the method includes receiving a registration image of both an origin marker and an expansion marker. The location of the origin marker in the physical space is stored in a data store in memory or mass storage of the computing device. The expansion marker has a location in the physical space that is unknown to, and thus not stored in, the computing device. At 220, the method includes calculating a location in the physical world of the expansion marker relative to the location in the physical world of the origin marker based on a position of each of the expansion marker and the origin marker in the registration image. Example registration images are schematically depicted in FIGS. 4A-4H described above.

At 230, the method includes defining a marker graph having an origin marker node at a location corresponding to the known location of the origin marker in the physical space. An example marker graph is depicted in FIGS. 5 and 5A described above.

At 240, the method includes adding an expansion marker node to the marker graph as a child node of the origin marker node at a location in the marker graph that corresponds to the relative location of the expansion marker. At 250, the method includes calculating, based the location of the expansion marker node and the origin marker node in the marker graph, the location of the camera in the physical space at the time of capturing the registration image.

It will be appreciated that method 200 may be used to identify the locations of a plurality of markers. Thus, consider that the expansion marker is a first expansion marker, the expansion marker node is a first expansion marker node, and the registration image is a first registration image. Under such circumstances, as shown at 260, the method may further include receiving a second registration image of both the first expansion marker and a second expansion marker, the second expansion marker having a location in the physical world that is unknown to, and thus not stored in, the computing device. At 270 the method may include calculating the location in the physical world of the second expansion marker relative to the location in the physical world of the first expansion marker based on a position of each of the first expansion marker and the second expansion marker in the second registration image. At 280 the method may include adding a second expansion marker node to the marker graph as a child of the first expansion marker node. At 290, the method may further include calculating the location of the camera in the physical space at the time of capturing the second registration image based on the location of the second expansion marker node in the marker graph. In this way, the physical space in which augmented reality objects may be displayed with accurate camera registration may be increased, through the use of expansion markers placed in unknown, not predefined locations, which can be tracked through imaging and graph representation to a known location or an origin marker.

Figure 7:
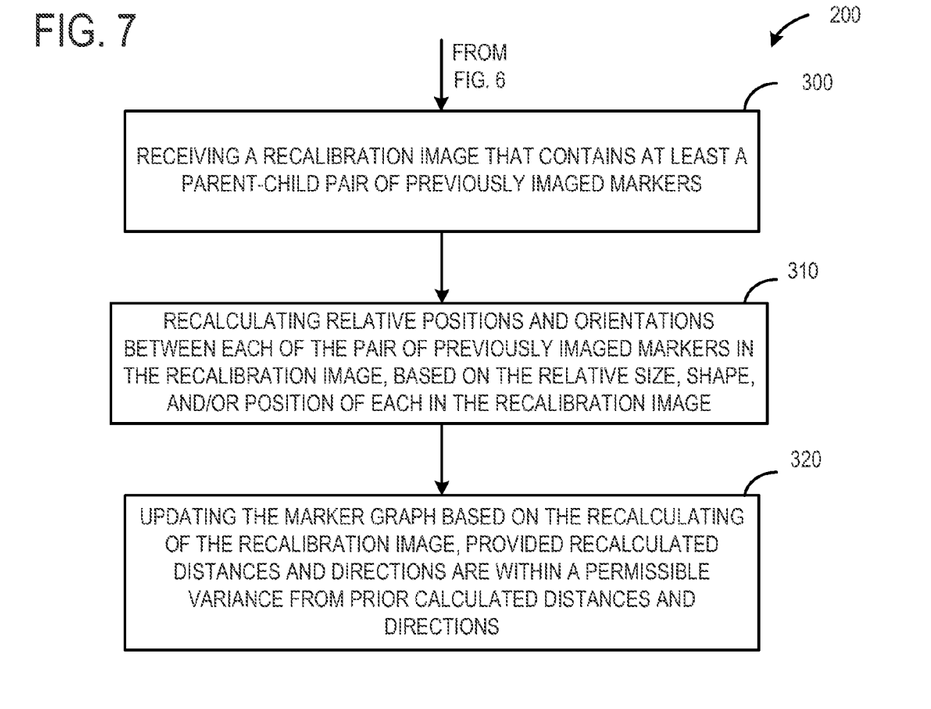
FIG. 7 is a continuation of the flowchart of FIG. 6.

FIG. 7 illustrates a continuation of method 200. As described above, in some embodiments, images of markers already added to the marker graph may be received. These images may be referred to as recalibration images, and are be used to recalculate a relative position of an expansion marker to another marker, to increase the accuracy of the marker graph over time. FIG. 4G contains an example recalibration image, as described above.

At 300, the method includes receiving a recalibration image that contains at least a parent-child pair of previously imaged markers, such as a parent marker and a child marker. It will be appreciated that the parent marker may be the origin maker or an expansion marker, and that the child marker may be an expansion marker.

At 310, the method may include recalculating relative differences in positions and orientations between each of the pair of previously imaged markers in the recalibration image, based on the relative size, shape, and/or position of each in the image. Recalculating may be performed via methods similar to those used to initially calculate the relative position. However, in some embodiments, other recalculation techniques may be employed which take into account that the image is a recalibration image. For example, recalculating may include averaging a plurality of previously calculated relative positions. For example, if the position of the child marker has been calculated relative to the parent marker numerous times, the recalculation may include averaging all previous calculations.

At 320, the method includes updating the marker graph based on the recalculating of the recalibration image. However, in some embodiments, the marker graph is only updated if the recalculated distances and direction between the pair of markers is within a predefined permissible variance from prior calculated distances and directions between the pair of markers. In this manner, recalculations based on out-of-range data that may be erroneous are avoided. For example, if a recalculation indicates a relative position that is far different (e.g., 1 standard deviation) from all previous calculations, the marker graph will not be updated. In this way, the marker graph may reflect a location indicative of an aggregate calculation, reducing errors that may be associated with outlying data.

The systems and methods described above may be used to expand the physical space in which a camera of an augmented reality system may be registered, through the use of expansion markers having unknown locations, which are estimated using image processing techniques, and which are represented relative to a known origin in a marker graph. With repeated imaging of the markers, the accuracy of the marker graph increases, as does the accuracy of the camera registration.

Figure 8:
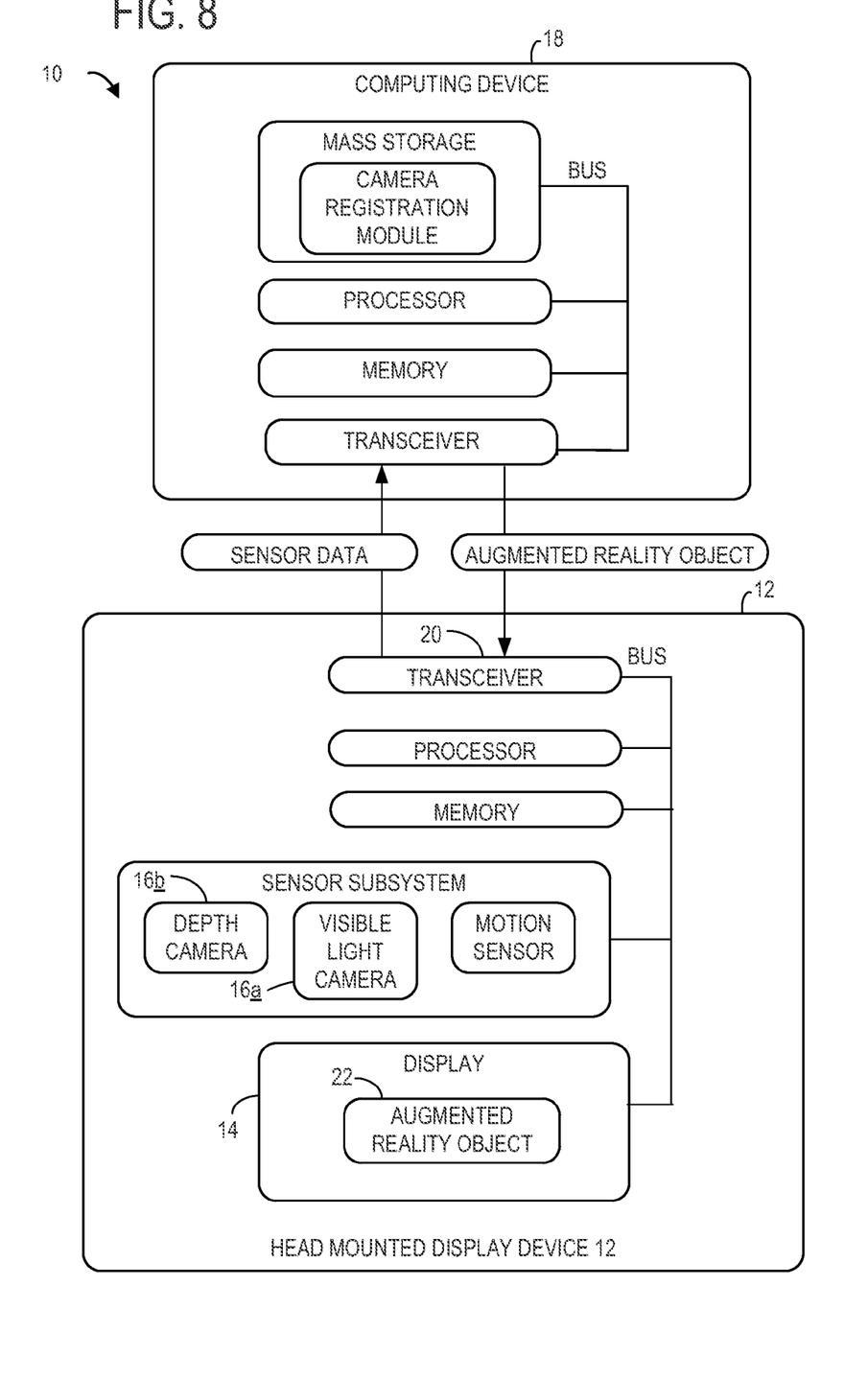
FIG. 8 is a schematic view of an example computing system that may be used in the embodiment of FIG. 1, and that may be used for performing the methods of FIG. 6 and FIG. 7.

FIG. 8 schematically shows internal details of example computer hardware that may be used in augmented reality system 10, described above, and FIG. 9 schematically illustrates internal details of example computer hardware that may be used in augmented reality system 10a describe above. Further, it will be appreciated that the methods of FIGS. 6 and 7 may be implemented on the hardware illustrated in FIGS. 8 and 9.

FIG. 8 illustrates that computing device 18 includes a processor, mass storage, memory, and communication bus. Computing device 18 may include a transceiver configured to communicate wirelessly with head mounted display device 12. Computing device 18 may also optionally include a display and user input devices such as keyboards, mice, game controllers, microphones, and/or touch screens, for example. A camera registration module is stored on the mass storage device, and configured to be executed via the processor using portions of memory to perform the camera registration functions described above.

Head mounted display device 12 includes a transceiver 20 configured to communicate with the transceiver of the computing device 18, as well as a processor, memory, and a sensor subsystem including a visible light camera 16a, depth camera 16b, and motions sensors such as gyroscopes, accelerometers, and GPS sensors. The head mounted display device 12 sends the sensor data, including images captured by the visible light camera to the computing device 18, which uses the images to perform camera registration per the methods described above. The head mounted display device 12 is configured to display on a see-through display 14 an augmented reality object 22 generated by and received from the computing device 18.

Figure 9:
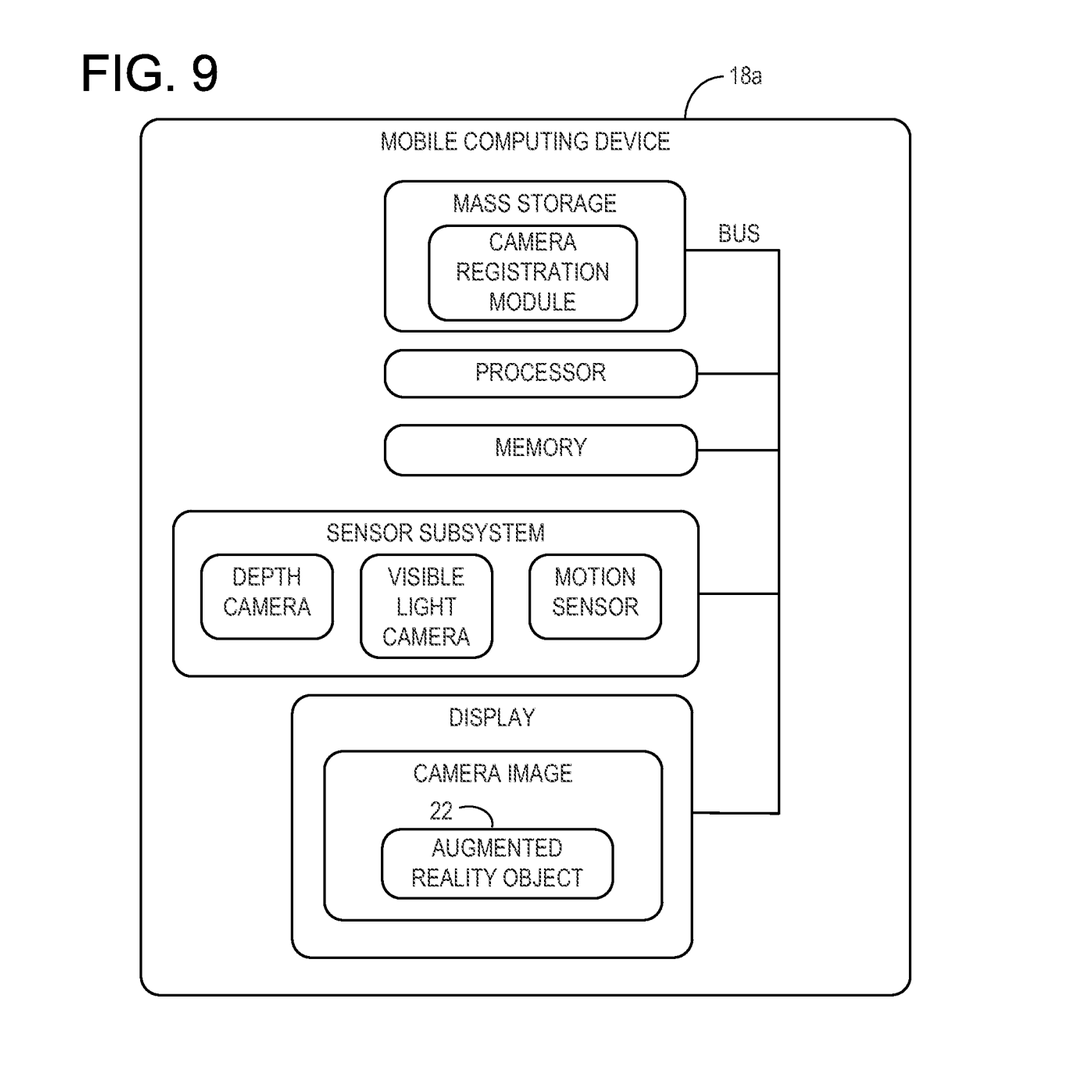
FIG. 9 is a schematic view of an example computing system that may be used in the embodiment of FIG. 3, and that may be used for performing the methods of FIG. 6 and FIG. 7.

FIG. 9 illustrates internal details of a mobile computing device 18a as shown in augmented reality system 10a of FIG. 3. Mobile computing device has many of the same components as computing device 18, which will not be redescribed for the sake of brevity. A difference between the mobile computing device 18a and the computing device 18 is that the sensor subsystem, including visible light camera, depth camera and motion sensors are included within the mobile computing device, and the display of the mobile computing device is not typically see-through, but rather is configured to display an image captured by the visible light camera, with an augmented reality object 22 superimposed thereon.

The processors described herein may include one or more physical devices configured to execute a set of instructions. The instructions may be stored in mass storage and loaded into memory via a bus. The mass storage units described herein are non-volatile storage units and may be removable or built-in devices. In some embodiments, the processor, mass storage and memory may be integrated into one or more integrated devices, such as an application specific integrated circuit or a system on a chip.

The terms "module," "program," and "engine" may be used to indicate computer software that is implemented to perform one or more particular functions. Such a module, program, or engine may be stored as instructions in mass storage, and executed by a processor using portions of memory to achieve the functions described herein. The terms "module," "program," and "engine" are meant to encompass individual or groups of executable files, data files, libraries, drivers, scripts, database records, etc.

The systems described herein may incorporate a depth camera that includes left, and right cameras of a stereoscopic vision system, for example. Time-resolved images from both cameras may be registered to each other and combined to yield depth-resolved video. In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth map of the scene may be constructed. Still in other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

The visible light cameras described herein may include virtually any type of digital camera capable of capturing visible light as image data. As a nonlimiting example, an RGB camera may be used that includes a charge coupled device image sensor.

The motion sensors described herein may be a variety of motions sensors, including, but are not limited to, accelerometers, gyroscopes, and global positioning systems.

Computer readable storage media may be provided to store and/or transfer data and/or instructions executable to by the processor of the computing device to implement the herein described methods and processes. The computer-readable storage media are physical devices that may take the form of CDs, DVDs, HD-DVDs, Blu-Ray Discs, EEPROMs, and/or floppy disks, among others. Thus, the computing device described above may be provided with appropriate drives or readers to read computer readable storage media of these formats. It will be appreciated that the computer readable storage media are non-volatile storage media and thus instructions may be stored on the computer readable storage media in a non-transitory manner. These instructions may be read from the computer readable storage media and stored on mass storage of the computing device, to be implemented by the processor using portions of memory.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method executable by a computing device of an augmented reality system, for registering a camera in a physical world, the method comprising, at a registration module executed on the computing device:

receiving a series of images including depth information and pixel data of an origin marker and one or more expansion markers, the origin marker and the one or more expansion markers having predetermined characteristics recognizable by the computing device, the location of the origin marker in the physical world being stored in a data store of the computing device, the one or more expansion markers having locations in the physical world that are different from the origin marker and unknown to the computing device;

identifying a registration image from the series of images that includes both the origin marker and an expansion marker of the one or more expansion markers;

calculating a relative location in the physical world of the expansion marker relative to a location in the physical world of the origin marker based on a position of each of the expansion marker and the origin marker in the registration image and determining a distance from the origin marker and the expansion marker to the camera based on the depth information;

constructing a marker graph having an origin marker node that includes location data corresponding to the known location of the origin marker in the physical world;

adding an expansion marker node to the marker graph as a child node of the origin marker node, including location data that corresponds to the relative location of the expansion marker;

calculating, based on location data of the expansion marker node and the origin marker node in the marker graph and their respective distances from the camera, a location of the camera in the physical world at a time of capturing the registration image;

identifying a recalibration image from the series of images that includes a parent marker and an associated child marker, wherein the parent marker corresponds to a marker node in the marker graph that is a parent of the child marker node that corresponds to the associated child marker;

recalculating a relative location of the child marker relative to the parent marker from the recalibration image, wherein if the recalculated relative location is outside of a permissible variance as compared to a previously calculated relative location, the marker graph is not updated, and wherein if the recalculated relative location is not outside of the permissible variance as compared to the previously calculated relative location, the method further comprises:

updating location data of the child marker node in the marker graph based on the recalculated relative location of the child marker to the parent marker; and adjusting location data for all marker nodes descendant from the child marker node in the marker graph based on the recalculated relative location of the child marker to the parent marker, wherein at least one of the marker nodes for which location data is adjusted is associated with a marker that is not in the recalibration image.

2. The method of claim 1, where the expansion marker is a first expansion marker, the expansion marker node is a first expansion marker node, and the registration image is a first registration image, and the method further comprises:

identifying a second registration image from the series of images that includes both the first expansion marker and a second expansion marker, the second expansion marker having a location in the physical world that is unknown to the computing device;

calculating a relative location in the physical world of the second expansion marker relative to a location in the physical world of the first expansion marker based on a position of each of the first expansion marker and the second expansion marker in the second registration image; and adding a second expansion marker node to the marker graph as a child of the first expansion marker node, including location data that corresponds to the relative location of the second expansion marker;

wherein a location of the camera in the physical world at a time of capturing the second registration image is calculated based further on location data of the second expansion marker node in the marker graph.

3. The method of claim 1, where the recalculating includes averaging a plurality of previously calculated relative locations.

4. The method of claim 1, where the marker graph is a directed acyclic graph.

5. The method of claim 1, where the camera is included in a head mounted display device.

6. The method of claim 5, where the computing device is configured to communicate wirelessly with the head mounted display device via a transceiver.

7. The method of claim 1, where the computing device is a mobile computing device, and the camera is formed integrally with the mobile computing device.

8. The method of claim 1, where each marker has a predefined shape and an optical code formed thereon that identifies the marker.

9. An augmented reality system for registering a camera in a physical world, the system comprising a computing device configured to execute a registration module, the registration module configured to:

receive from a camera a series of images including depth information and pixel data of an origin marker and one or more expansion markers, the origin marker and the one or more expansion markers having predetermined characteristics recognizable by the computing device, a location of the origin marker in a physical world being stored in a data store of the computing device, the one or more expansion markers having locations in the physical world that are different from the origin marker and unknown to the computing device;

identify a registration image from the series of images that includes both the origin marker and an expansion marker of the one or more expansion markers;

calculate a relative location in the physical world of the expansion marker relative to the location in the physical world of the origin marker based on a position of each of the expansion marker and the origin marker in the registration image and determine a distance from the origin marker and the expansion marker to the camera based on the depth information;

construct a marker graph having an origin marker node that includes location data corresponding to the known location of the origin marker in the physical world;

add an expansion marker node to the marker graph as a child node of the origin marker node, including location data that corresponds to the relative location of the expansion marker;

calculate, based on location data of the expansion marker node and the origin marker node in the marker graph and their respective distances from the camera, a location of the camera in the physical world at a time of capturing the registration image;

identify a recalibration image from the series of images that includes a parent marker and an associated child marker, wherein the parent marker corresponds to a marker node in the marker graph that is a parent of the child marker node that corresponds to the associated child marker;

recalculate a relative location of the child marker relative to the parent marker from the recalibration image, wherein if the recalculated relative location is outside of a permissible variance as compared to a previously calculated relative location, the marker graph is not updated, and wherein if the recalculated relative location is not outside of the permissible variance as compared to the previously calculated relative location, the registration module is further configured to:

update location data of the child marker node in the marker graph based on the recalculated relative location of the child marker to the parent marker; and adjust location data for all marker nodes descendant from the child marker node in the marker graph based on the recalculated relative location of the child marker to the parent marker, wherein at least one of the marker nodes for which location data is adjusted is associated with a marker that is not in the recalibration image.

10. The system of claim 9, where the expansion marker is a first expansion marker, the expansion marker node is a first expansion marker node, and the registration image is a first registration image, and the registration module is further configured to:

identify a second registration image from the series of images of both the first expansion marker and a second expansion marker, the second expansion marker having a location in the physical world that is unknown to the computing device;

calculate a relative location in the physical world of the second expansion marker relative to a location in the physical world of the first expansion marker based on a position of each of the first expansion marker and the second expansion marker in the second registration image; and add a second expansion marker node to the marker graph as a child of the first expansion marker node, including location data corresponding to the relative location of the second expansion marker;

wherein the location of the camera in the physical world at the time of capturing the second registration image is calculated based further on location data of the second expansion marker node in the marker graph.

11. The system of claim 9, where the recalculating includes averaging a plurality of previously calculated relative positions.

12. The system of claim 9, where the marker graph is a directed acyclic graph.

13. The system of claim 9, where the camera is included in a head mounted display device.

14. The system of claim 13, where the registration module is further configured to communicate wirelessly with the head mounted display device via a transceiver.

15. A method executable by a computing device of an augmented reality system for registering a camera in a physical world, the method comprising:

identifying an origin marker in at least one image in a series of images of a physical world captured by a camera of an augmented reality system, the images including depth information and pixel data and the origin marker having predetermined characteristics recognizable by the computing device;

constructing a marker graph having an origin marker node at a location corresponding to a known location of the origin marker in the physical world and determining a distance from the origin marker to the camera based on the depth information;

analyzing in real-time the series of images to identify a plurality of expansion markers and determining a distance from the expansion markers to the camera based on the depth information, the expansion markers having predetermined characteristics recognizable by the computing device, for each expansion marker the analyzing comprising:
- identifying at least one image in the series that contains both the expansion marker and at least one previously imaged marker, the previously imaged marker being either the origin marker or a previously imaged expansion marker;
- determining a relative difference in position and orientation between the at least one previously imaged marker and the expansion marker based on the size, shape, and/or position of each in the at least one of the images; and
- adding an expansion marker node for the expansion marker as a child of the at least one previously imaged marker to the marker graph, at a relative distance and direction to the at least one previously imaged marker node; calculating a current position of the camera of the augmented reality system in the physical world based on a location of a node in the marker graph corresponding to a most recently imaged marker, relative to the origin marker and any intermediate markers and based on the respective distances of the markers from the camera;

recalibrating the marker graph by:
- receiving a recalibration image that contains at least a parent-child pair of previously imaged markers;
- recalculating relative distances and directions between each of the plurality of previously imaged markers in the recalibration image, based on the relative position of each in the image, wherein if the recalculated relative distances and directions are outside of a permissible variance as compared to previously calculated relative distances and directions between each of the plurality of previously imaged markers in the recalibration image, the marker graph is not updated, and wherein if the recalculated relative distances and directions are not outside of a permissible variance as compared to previously calculated relative distances and directions between each of the plurality of previously imaged markers in the recalibration image, recalibrating the marker graph further comprises:
- updating a position of a corresponding child marker node in the marker graph based on a recalculated relative location of the child marker to the parent marker; and
- adjusting a position of all descendant marker nodes that are descendant from the child marker node in the marker graph based on the recalculated relative location of the child marker to the parent marker, wherein at least one of the marker nodes for which a position is adjusted is associated with a marker that is not in the recalibration image.

* * * * *